(12) United States Patent
Natorski et al.

(10) Patent No.: US 11,407,197 B2
(45) Date of Patent: Aug. 9, 2022

(54) MULTI-LAYER EXERCISE MAT

(71) Applicant: ROGERS CORPORATION, Chandler, AZ (US)

(72) Inventors: David Natorski, Hebron, CT (US); Rodney Barber, Sterling, CT (US); Jim Labrake, Norwich, CT (US); David C. Sherman, Ashford, CT (US)

(73) Assignee: ROGERS CORPORATION, Chandler, AZ (US)

( * ) Notice: Subject to any disclaimer, the term of this patent is extended or adjusted under 35 U.S.C. 154(b) by 0 days.

(21) Appl. No.: 16/690,855

(22) Filed: Nov. 21, 2019

(65) Prior Publication Data
US 2020/0164611 A1 May 28, 2020

Related U.S. Application Data (60) Provisional application No. 62/772,404, filed on Nov. 28, 2018.

(51) Int. Cl.
*B32B 3/30* (2006.01)
*B32B 5/18* (2006.01)
(Continued)

(52) U.S. Cl.
CPC ............ *B32B 3/30* (2013.01); *A63B 21/4037* (2015.10); *B32B 5/18* (2013.01); *B32B 5/32* (2013.01);
(Continued)

(58) Field of Classification Search
CPC ......... A63B 21/4037; B32B 3/30; B32B 5/18; B32B 5/32; B32B 25/08; B32B 25/042;
(Continued)

(56) References Cited

U.S. PATENT DOCUMENTS 2,132,757 A * 10/1938 Paulson ................. A63H 33/04
446/124
3,016,317 A 1/1962 Brunner
(Continued)

FOREIGN PATENT DOCUMENTS

CN 201775897 U 3/2011
CN 205216053 U 5/2016
(Continued)

OTHER PUBLICATIONS

Great Britian Combined Search and Examination Report for Great Britian Application No. 1916816.0, Application Filing Date Nov. 19, 2019; dated May 20, 2020; 6 pages.

*Primary Examiner* — Maria V Ewald
*Assistant Examiner* — Ethan A. Utt
(74) *Attorney, Agent, or Firm* — Cantor Colburn LLP (57) ABSTRACT

A multi-layer exercise mat including a first layer including an outer surface and an opposing inner surface, the opposing inner surface of the first layer including a first array of three-dimensional features integral with the first layer; and a second layer including an outer surface and an opposing inner surface, the opposing inner surface of the second layer including a second array of three-dimensional features integral with the second layer. The first and second arrays of three-dimensional features are configured to grip each other to removably secure the inner surface of the first layer to the inner surface of the second layer.

15 Claims, 7 Drawing Sheets

(51) Int. Cl.
    *B32B 5/32*     (2006.01)
    *B32B 27/08*     (2006.01)
    *B32B 25/08*     (2006.01)
    *B32B 25/04*     (2006.01)
    *B32B 27/30*     (2006.01)
    *B32B 27/32*     (2006.01)
    *B32B 27/40*     (2006.01)
    *A63B 21/00*     (2006.01)
    *B32B 38/06*     (2006.01)

(52) U.S. Cl.
    CPC ............ *B32B 25/042* (2013.01); *B32B 25/08* (2013.01); *B32B 27/08* (2013.01); *B32B 27/304* (2013.01); *B32B 27/306* (2013.01); *B32B 27/32* (2013.01); *B32B 27/40* (2013.01); *B32B 38/06* (2013.01); *B32B 2266/0278* (2013.01); *B32B 2266/06* (2013.01); *B32B 2266/08* (2013.01); *B32B 2307/536* (2013.01); *B32B 2307/72* (2013.01); *B32B 2471/04* (2013.01); *Y10T 428/24496* (2015.01); *Y10T 428/24504* (2015.01); *Y10T 428/24512* (2015.01); *Y10T 428/24612* (2015.01)

(58) Field of Classification Search
    CPC ..... B32B 27/08; B32B 27/304; B32B 27/306; B32B 27/32; B32B 27/40; B32B 38/06; B32B 2266/0278; B32B 2266/06; B32B 2266/08
    See application file for complete search history.

(56) References Cited

U.S. PATENT DOCUMENTS

| | | | |
|---|---|---|---|
| 3,222,697 A * | 12/1965 | Scheermesser | A47C 27/144 |
| | | | 428/160 |
| 4,137,583 A | 2/1979 | Baldwin et al. | |
| 4,147,007 A * | 4/1979 | Eppich | F16B 5/07 |
| | | | 446/114 |
| 4,329,981 A * | 5/1982 | Dungl | A61H 7/001 |
| | | | 601/28 |
| 4,574,101 A | 3/1986 | Tricca et al. | |
| 4,957,788 A * | 9/1990 | Colonel | E01C 13/08 |
| | | | 428/119 |
| 5,540,638 A | 7/1996 | Wilkinson | |
| 6,082,023 A * | 7/2000 | Dalton | A43B 13/187 |
| | | | 36/103 |
| 6,133,333 A * | 10/2000 | Chaudhary | C08L 25/06 |
| | | | 521/139 |
| 7,137,157 B2 | 11/2006 | Nichols | |
| 7,485,071 B2 | 2/2009 | Edwards | |
| D615,792 S | 5/2010 | Leigh | |
| 7,976,933 B2 | 7/2011 | Yeh | |
| 8,220,087 B2 | 7/2012 | Mlla et al. | |
| 8,309,198 B2 | 11/2012 | Bell et al. | |
| D671,784 S | 12/2012 | Gallie, II | |
| 8,404,325 B2 | 3/2013 | Kuo | |
| 8,540,538 B2 * | 9/2013 | Yeh | B32B 3/08 |
| | | | 441/65 |
| 8,631,833 B2 | 1/2014 | Garbarino | |
| 8,765,253 B1 | 7/2014 | Smaldone et al. | |
| 8,822,012 B2 | 9/2014 | Franks et al. | |
| 9,015,881 B2 | 4/2015 | Kress | |
| 9,586,083 B2 | 3/2017 | Lazarchik et al. | |
| 9,776,033 B2 | 10/2017 | Fasullo | |
| 2003/0235684 A1 | 12/2003 | Ogle | |
| 2004/0250346 A1 | 12/2004 | Vasishth | |
| 2006/0073305 A1 | 4/2006 | Kole | |
| 2007/0275827 A1 | 11/2007 | Glaser | |
| 2009/0110867 A1 | 4/2009 | Feng Shen | |
| 2010/0021690 A1 | 1/2010 | McCarthy | |
| 2012/0124740 A1 * | 5/2012 | Castle | A47D 15/003 |
| | | | 5/420 |
| 2012/0227181 A1 | 9/2012 | Cintas et al. | |
| 2015/0013066 A1 | 1/2015 | Foubister et al. | |
| 2016/0030799 A1 | 2/2016 | Sutherland | |
| 2016/0059065 A1 | 3/2016 | Fasullo | |
| 2016/0129300 A1 | 5/2016 | Moore et al. | |
| 2016/0332023 A1 | 11/2016 | Taylor et al. | |
| 2017/0189742 A1 | 7/2017 | Mangum et al. | |
| 2017/0202300 A1 * | 7/2017 | Sherman | A43B 17/02 |
| 2017/0291059 A1 | 10/2017 | Lin | |
| 2017/0291060 A1 | 10/2017 | Lin | |
| 2018/0296014 A1 | 10/2018 | Carter | |
| 2018/0360250 A1 | 12/2018 | Publicover et al. | |

FOREIGN PATENT DOCUMENTS

| | | |
|---|---|---|
| CN | 205886039 U | 1/2017 |
| CN | 206334267 U | 7/2017 |
| CN | 206381530 U | 8/2017 |
| CN | 108042988 A | 5/2018 |
| CN | 108126295 A | 6/2018 |
| GB | 2388052 A | 5/2003 |
| TW | 526425 U | 8/2016 |
| WO | 2017114781 A2 | 7/2017 |

* cited by examiner

ABCDEFGHIJKLM
NOPQRSTUVWX
YZÀÅÉÎÕ&1234
567890[$€€.,!?]

Fig. 12

MULTI-LAYER EXERCISE MAT

CROSS REFERENCE TO RELATED APPLICATIONS

This application claims the benefit of U.S. Patent Application No. 62/772,404, filed Nov. 28, 2018, incorporated herein by reference in its entirety.

BACKGROUND

This disclosure relates to an exercise mat, such as a yoga mat.

Exercise mats are specially fabricated mats used as an aid during exercise, for example, during the practice of yoga. Depending on the type of exercise, the skill of the user, and other considerations, different properties may be desired for the mat.

BRIEF DESCRIPTION

Disclosed herein is a multi-layer exercise mat including a first layer including an outer surface and an opposing inner surface, the opposing inner surface of the first layer including a first array of three-dimensional features integral with the first layer; and a second layer including an outer surface and an opposing inner surface, the opposing inner surface of the second layer including a second array of three-dimensional features integral with the second layer. The first and second arrays of three-dimensional features are configured to grip each other to removably secure the inner surface of the first layer to the inner surface of the second layer.

In an embodiment, a method of manufacture of the multi-layer exercise mat includes forming the first layer; and forming the second layer.

The above and other features and advantages are readily apparent from the following detailed description, examples, and claims when taken in connection with the accompanying drawings.

BRIEF DESCRIPTION OF THE DRAWINGS

Referring to the exemplary non-limiting figures wherein like elements are numbered alike:

FIG. 5A to FIG. 5L are schematic representations or cross-sectional views of shapes of three-dimensional features of exemplary embodiments;

FIG. 6A to FIG. 6E are schematic cross-sectional views of three-dimensional features of exemplary embodiments;

DETAILED DESCRIPTION

The inventors hereof have developed a multi-layer exercise mat including separable, interchangeable layers. The layers of the multi-layer exercise mat can be provided with different properties and performance, and can be interchanged, yet secured to each other.

For example, a user may wish to have an exercise mat suitable for a first activity and a second activity, with the exercise mat desirably providing different properties for the first activity and the second activity. For example, a relatively high level of cushioning may be desirable for the first activity, while a relatively high level of slip resistance may be desirable for the second activity. Alternatively, the same slip resistance may be desirable for multiple activities or users, but a relatively high level of cushioning may be desirable for a first activity or user, while a relatively low level of cushioning may be desirable for the second activity. Rather than requiring a multitude of different mats, with each mat providing certain properties (e.g., cushioning, slip resistance, etc.), the multi-layer exercise mat allows for interchangeability of layers such that a customized mat of different properties can be provided.

Figure 1:
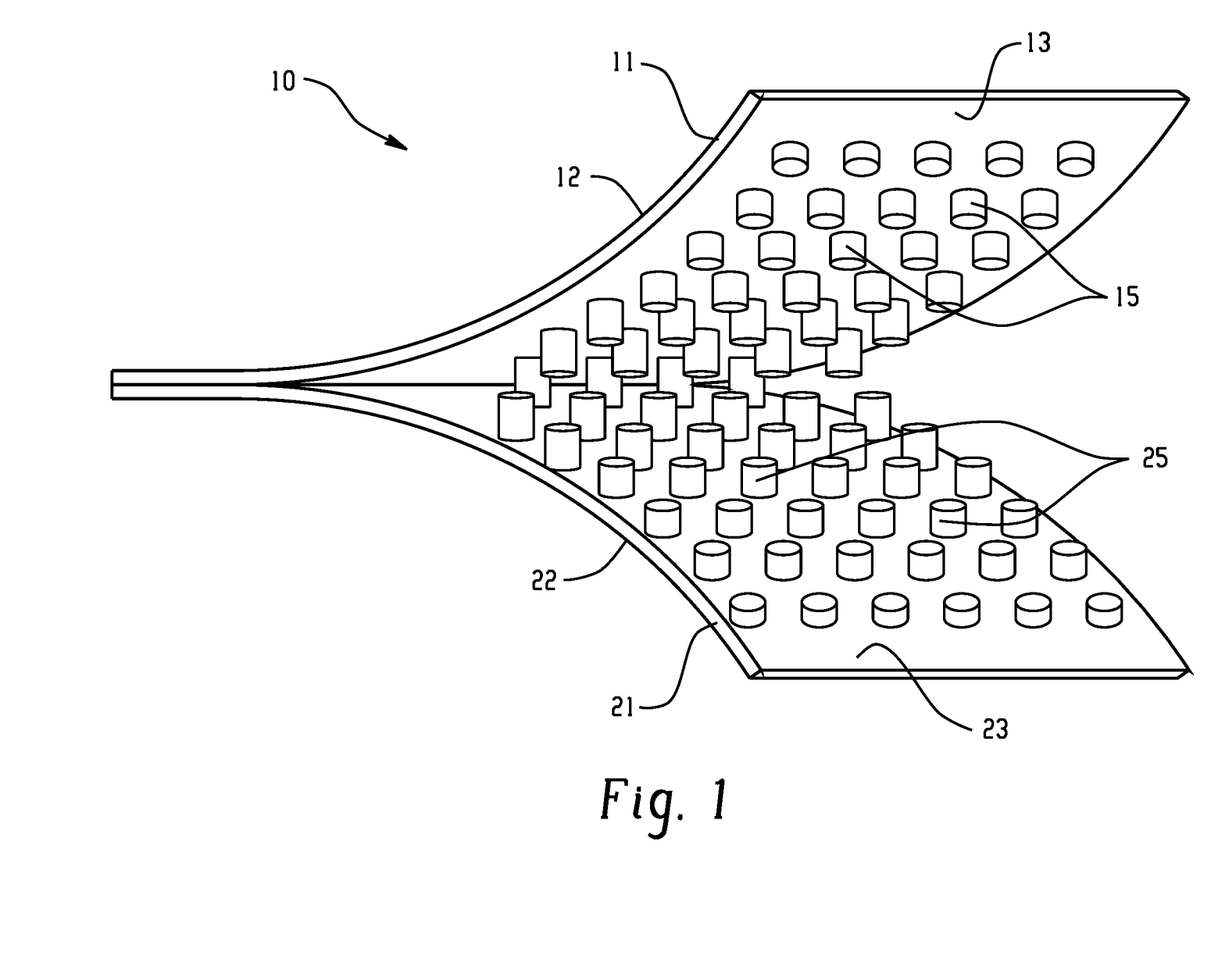
FIG. 1 shows an embodiment of a multi-layer exercise mat in a state in which first and second layers of the multi-layer exercise mat are partially secured to one another and partially separated.

The layers can be interchanged yet secured to each other by three dimensional features on an inner surface of each layer. As shown generally in FIG. 1, the multi-layer exercise mat 10 includes a first layer 11 and a second layer 21. The multi-layer exercise mat is shown in a state in which first and second layers 11, 21 are partially secured to one another and partially separated. First layer 11 includes an outer surface 12 and an opposing inner surface 13; and second layer 21 includes an outer surface 22 and an opposing inner surface 23. The opposing inner surface 13 of the first layer 11 includes a first array of three-dimensional features 15 integral with the first layer 11 and the opposing inner surface 23 of the second layer 21 includes a second array of three-dimensional features 25 integral with the second layer 21. As used herein, the term "integral with" (e.g., a three-dimensional feature integral with the first or second layer) means that the three-dimensional feature is formed as part of the layer and not added individually to a surface of the layer, for example by an a hot-melt process, an adhesive, or other fastener. "Integral with" further means that the three-dimensional feature is not be a hole that extends through both the outer surface and the opposing inner surface of a given layer. The first and second arrays of three-dimensional features 15, 25 are configured to interlock or grip each other to removably secure the inner surface 13 of the first layer to the inner surface 23 of the second layer. As used herein, "interlock"

and "grip" are interchangeable, and refer to the physical engagement of the array of three-dimensional features 15, 25. The first array of three-dimensional features can grip the second array of three-dimensional features to secure the first and second layers to each other through frictional force between the first and second arrays, resisting the relative motion of the first and second arrays and the first and second layers sliding against each other. As shown in FIG. 1, for example, the array of three-dimensional features 15 can be cylinders integral with of first layer 11 that collectively grip an array of cylinders 25 integral with the second layer 22, either tightly, e.g., snugly, or loosely. For example, as shown in FIG. 1, the first and second layers can have the same three-dimensional features where the array of the first three-dimensional features (cylinders) fits between the array of the second three dimensional features (also cylinders). The spaces between the cylinders are not cylindrical but are sized to frictionally engage the cylinders of the other layer. The size of the spaces can be adjusted to fit the layers together with more or less friction as desired for a given use.

Figure 2:
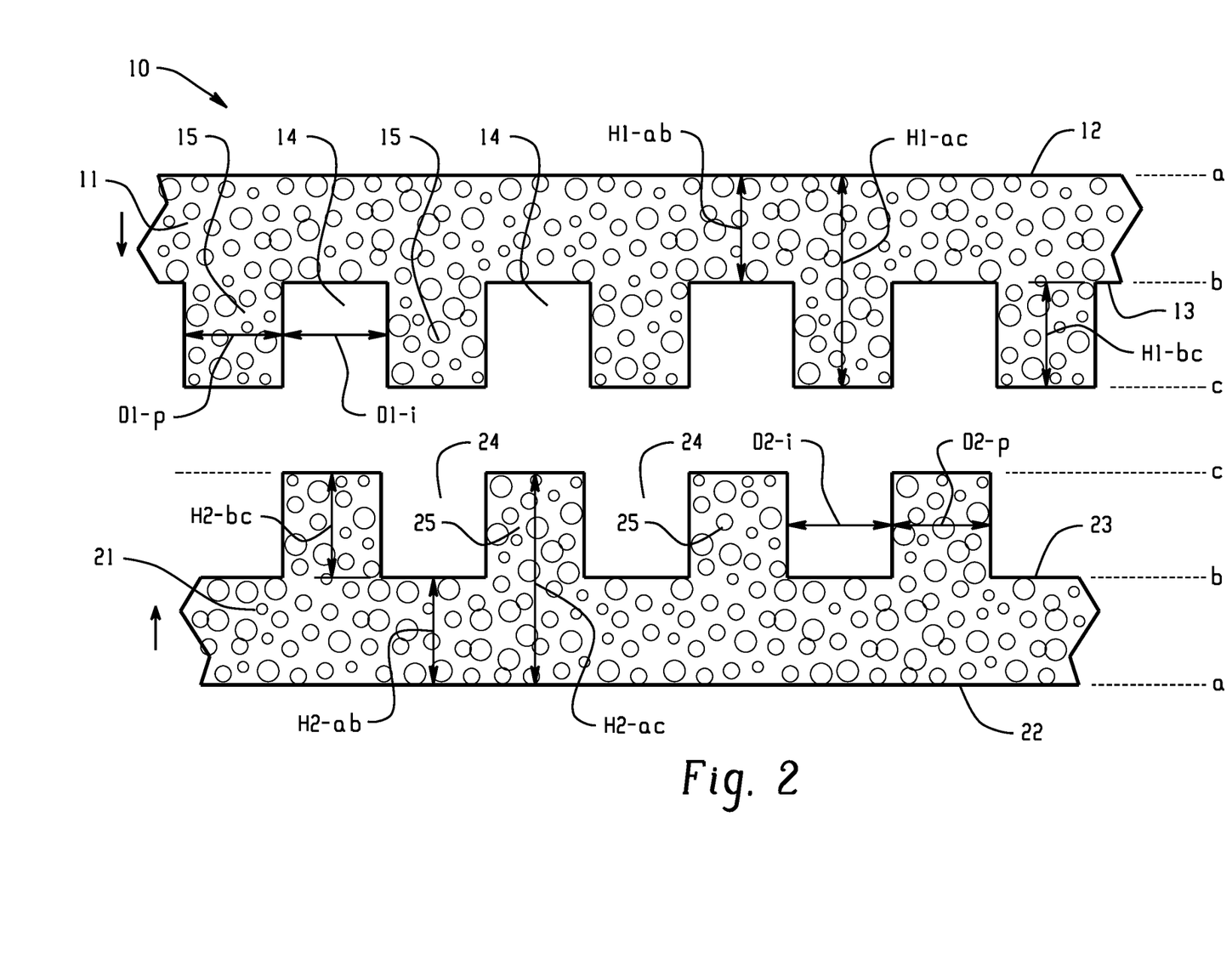
FIG. 2 shows a cross-section view of an embodiment of three-dimensional features integral with a first layer and three-dimensional features integral with a second layer.
Figure 3:
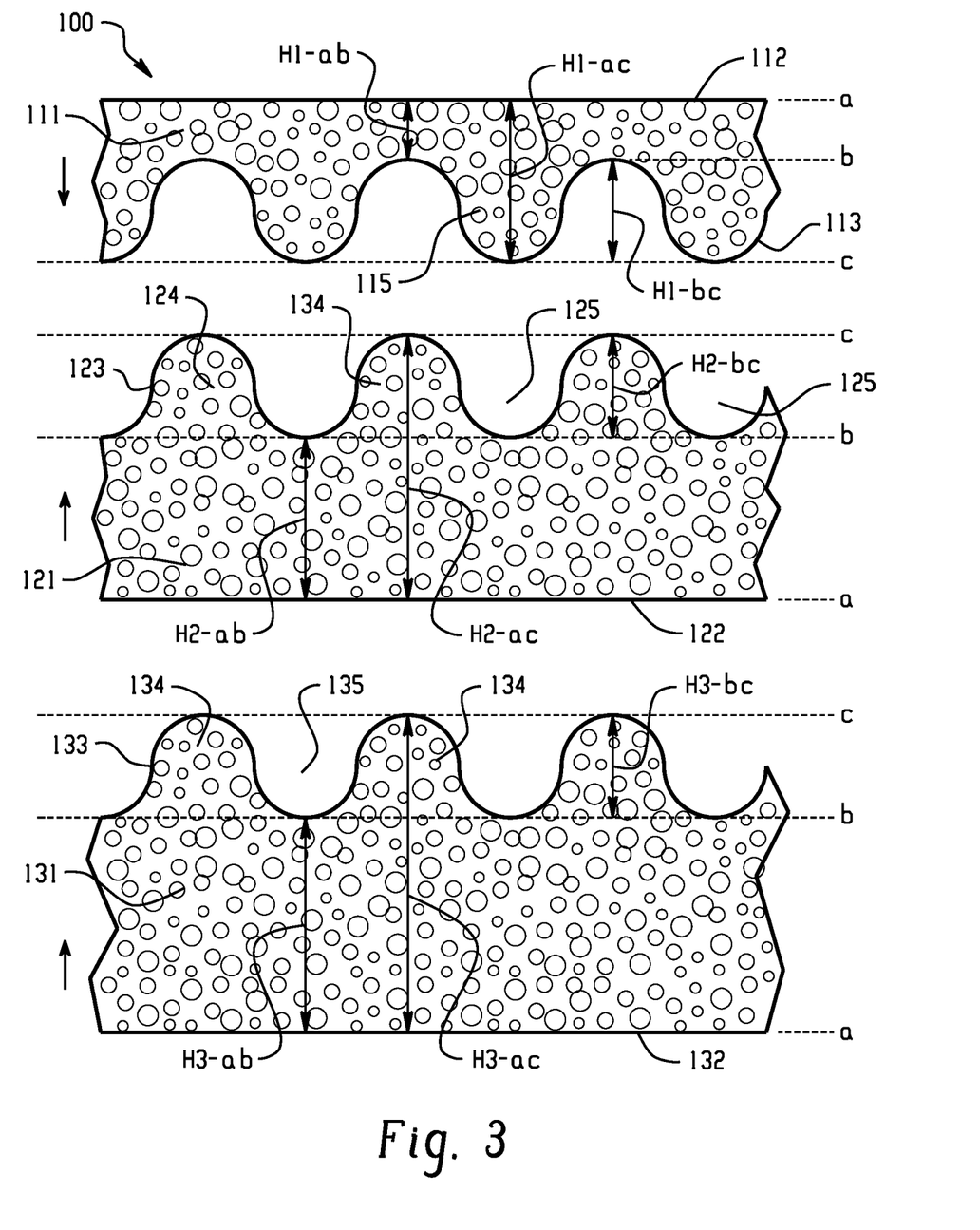
FIG. 3 shows a cross-section view of an embodiment of three-dimensional features integral with a first layer and three-dimensional features integral with a second layer.
Figure 4:
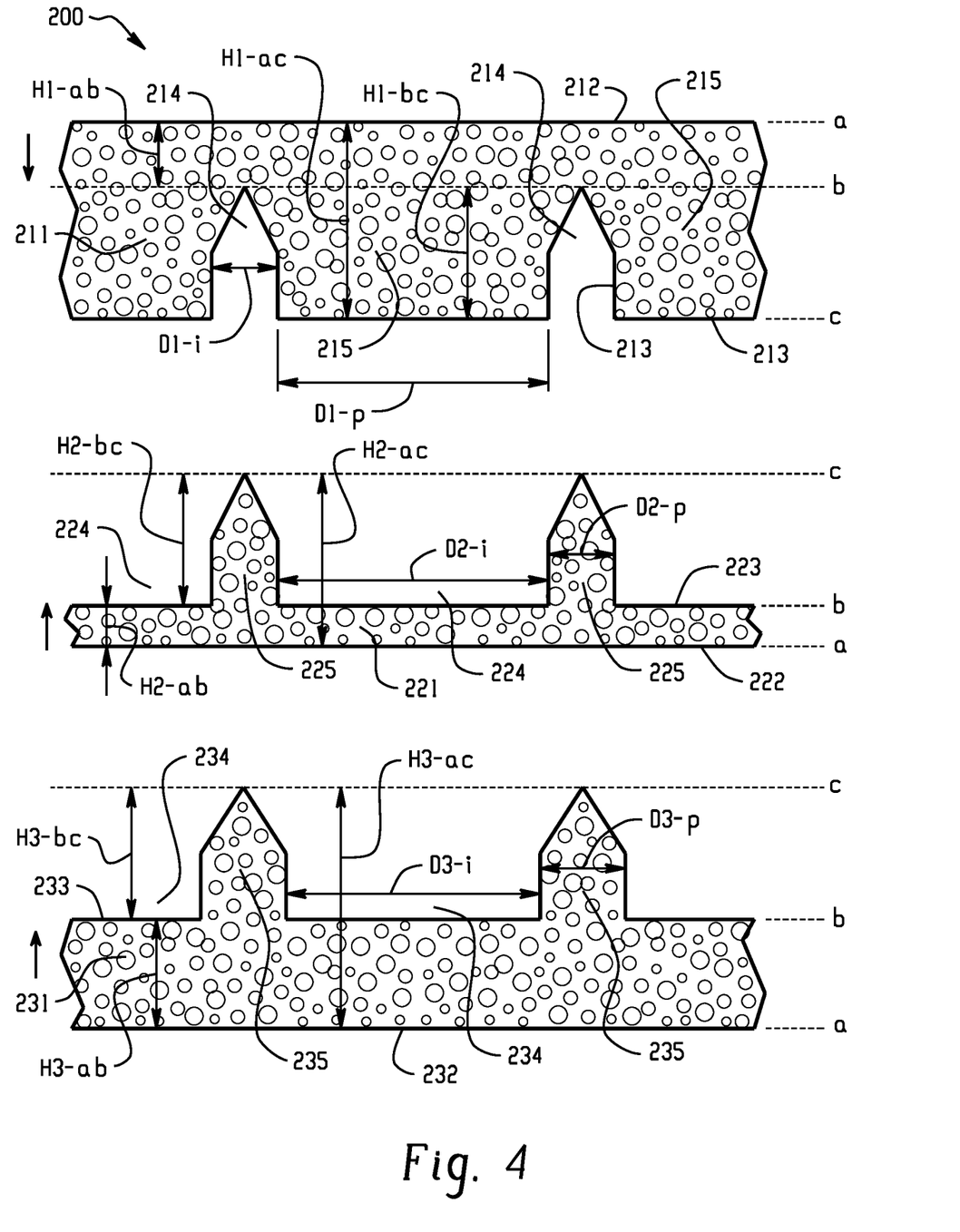
FIG. 4 shows a cross-section view of an embodiment of three-dimensional features integral with a first layer and three-dimensional features integral with a second layer.

A wide variety of layer thicknesses and shapes and sizes of the three-dimensional features can be used. Selection of the various parameters can depend on a desired degree of grip, the materials used, the manufacturing process used, and like considerations. For example, each layer of the embodiment shown in FIG. 1 can be manufactured from the same mold or embossing process. With reference to FIGS. 2-4, the three-dimensional features of the first array can include a first plurality of projections and indentations and the three-dimensional features of the second array can include a second plurality of projections and indentations. In some embodiments corresponding projections and indentations are mirror images of each other, such that the array of the first layer fully engages the array of the second layer. In these embodiments, the degree of friction can still be adjusted, for example by adjusting the type of material used or the shape of the three-dimensional features.

As shown in FIG. 2, which shows a cross-section view of an embodiment, the multi-layer exercise mat 10, where the layers are separated and frictionally engage in the direction of the arrows. Mat 10 includes a first layer 11 including an outer surface 12 and an opposing inner surface 13, and a second layer 21 including an outer surface 22 and an opposing inner surface 23. The opposing inner surface 13 of the first layer 11 includes a first array of rectangular three-dimensional features 14, 15 integral with the first layer 11. The opposing inner surface 23 of the second layer 21 includes a second array of rectangular or columnar three-dimensional features 24, 25 integral with the second layer. The first array of three-dimensional features 14, 15 and second array of three-dimensional features 24, 25 are configured to grip each other to removably secure the inner surface 13 of the first layer 11 to the inner surface 23 of the second layer 21.

In particular, the array of three-dimensional features 14, 15 of the multi-layer exercise mat 10 shown in FIG. 2 include indentations 14 and projections 15 and the array of three-dimensional features 24, 25 include corresponding projections 25 and indentations 24. The indentation diameters 14, 24 of the first layer 11 and second layer 21 are represented by D1-$i$ and D2-$i$, respectively, and the projection diameters 15, 25 of the first layer 11 and second layer 21 are represented by D1-$p$ and D2-$p$, respectively. The total thickness (height) of the first layer 11 is measured as a distance from the outer surface 12 ("a") of the first layer 11 to the farthest end of the projections 15 ("c") and is represented by height H1-$ac$, and the total thickness (height) of second layer 21 is measured as a distance from the outer surface 22 ("a") of the second layer 21 to the farthest end of the projections 25 ("c") and is represented by height H2-$ac$.

The first layer 11 includes a base surface ("b"), which can be characterized as a point from which the projections 15 extend, or conversely as a farthest depth to which the indentations 14 extend from the end of the projections 15 ("c"). Similarly, the second layer 21 can include a base surface ("b"), which can be characterized as a point from which the projections 25 extend or as a farthest depth to which the indentations 24 extend from the end of the projections 25 ("c"). The projection height (conversely, indentation depth) measured as a distance from the base surface ("b") of the first layer 11 to the end of the projections 15 ("c") is represented by H1-$bc$, and the projection height (conversely, injection depth) measured as a distance from the base surface ("b") of the second layer 21 to the end of the projections 25 ("c") is represented by H2-$bc$.

A base region of each layer is the region between outer surface 12, 22 ("a") and base surface "b". The base region of the first layer has a base height measured as a distance from the outer surface 12 ("a") of the first layer 11 to the base surface ("b") of the first layer 11 and is represented by H1-$ab$, and the base region of the second layer has a base height measured as a distance from the outer surface 22 ("a") of the second layer 21 to the base surface ("b") of the second layer 21, and is represented by H2-$ab$.

The dimensions of the layers can be varied independently to obtain desired properties. In FIG. 2, higher frictional force between the layers is obtained where the three-dimensional features are exactly corresponding, i.e., where D1-$i$ and D2-$i$ are equal, and H1-$bc$ and H2-$bc$ are equal so that the height of the projections and indentations of each layer are the same. Lower frictional force between the layers is obtained where one of D1-$i$ and D2-$i$, or one of H1-$bc$ and H2-$bc$, or both, is less than the other. For example, the first and second layers can have a D1-$i$ and D2-$i$ that differ by 0.1 to 5%, or 0.5 to 3%, to decrease friction between the layers. Alternatively, H1-$ab$ and H2-$ab$ can be varied to provide different properties such as different compression values.

This embodiment is illustrated FIG. 3. FIG. 3 further shows an embodiment where a set of three or more interchangeable layers are provided. FIG. 3 shows a cross-sectional view where the three-dimensional features 114, 115, 124, 125, 134, 135 have a cross section that is arcuate. The multi-layer exercise mat 100 includes a first layer 111 including an outer surface 112 and an opposing inner surface 113; a second layer 121 including an outer surface 122 and an opposing inner surface 123; and another second layer (a third layer) including an outer surface 132 and an opposing inner surface 133. In first layer 111 and second layer 121, the three-dimensional features 114, 115, 124, 125, are corresponding, i.e., have the same shape and size. However, base height H1-$ab$ is less than base height H2-$ab$, which can provide different compression properties where the same materials are used.

In contrast to FIG. 1 and FIG. 2, which show mats having a set of two layers, FIG. 3 further shows a mat having a set of three layers. In first layer 111, second layer 121, and third layer 131, the three-dimensional features 114, 115, 124, 125, 134, 135 are corresponding, i.e., have the same shape and size. However, base height H1-$ab$ is less than base height H2-$ab$, which is less than base height H3-$ab$. In this embodiment, the two second layers are interchangeable with the first layer and provide a multilayer mat having two different sets of properties. As will be understood by those of skill in the art, any number of layers can be provided to each set (e.g., a total of 3, 4, 5, 6, or more layers).

FIG. 4 shows a cross-section view of another embodiment of the multilayer mat. The multi-layer exercise mat 200 includes a first layer 211 including an outer surface 212 and an opposing inner surface 213; a second layer 221 including an outer surface 222 and an opposing inner surface 223; and another second layer (referred to for convenience as a third layer) 231 including an outer surface 232 and an opposing inner surface 233. As in FIG. 3, each layer has a different height H1-ab, H2-ab, and H3-ab, but the values of each differs, in that H2-ab<H1-ab<H3-ab.

The opposing inner surface of the first layer 211 includes a first array of three-dimensional features, indentations 214 and projections 215 integral with the first layer 211. Indentations 214 and projections 215 differ in shape, in contrast to those of FIG. 1, FIG. 2, and FIG. 3. The indentations 214, 224 further are a combination of cross-sectional shapes.

The opposing inner surface of the second layer includes a second array of three-dimensional features 224, 225 integral with the second layer; and the opposing inner surface of the third layer includes a third array of three-dimensional features 234, 235 integral with the third layer. In first layer 211 and second layer 221, the three-dimensional features 214, 215, 224, 225 correspond in both shape and size. In the third layer 131, the three-dimensional features of 234, 235 correspond in shape to those of the first and second layer, but differ in diameter, i.e., D1-$i$=D2-$p$, both of which are less than D3-$p$; and D1-$p$=D2-$i$, both of which are greater than D3-$i$. This embodiment may be useful in increasing friction to an even greater extent than when the diameters of the indentations of one layer is the same as the diameter of the projections of another layer.

The Figures are merely illustrative of the various shapes and dimensions of the layers. Other variations and combinations are possible, such as a variation in H1-bc vs. H2-bc vs. H3-bc between layers; variation of adjacent projection height (H1-bc) among an array; or the like.

The thickness of one or more of the layers can be selected to be within specific ranges that provide pressure spreading, compression, or comfort to the user. The total thickness of each layer (H1-ac, H2-ac, H3-ac, etc.) can be 1 to 50 mm, or 2 to 30 mm, or 5 to 25 mm. In some embodiments the total thickness of each layer is the same, in other embodiments the total thickness of one layer varies from the other layers (which are the same), or the total thickness of each layer differs from each other layer. Each of the layers individually can have a maximum base height (H1-ab, H2-ab, H3-ab, etc.) of 1 to 49.5 mm, or 5 to 30 mm, or 20 to 29 mm, or 22 to 28 mm, or 10 to 28 mm. In some embodiments the base thickness of each layer is the same, in other embodiments the base thickness of one layer varies from the other layers (which are the same as each other), or the total thickness of each layer differs from each of the other layers. In some embodiments the base height within a layer does not vary substantially (is within manufacturing tolerances). Each of the projections individually within a layer can have a maximum projection height (H1-bc, H2-bc, H3-bc, etc.) of 0.5 to 20 mm, preferably 1 to 10 mm, or 3 to 10 mm, or 2 to 8 mm. In some embodiments the maximum projection height of each layer is the same, in other embodiments the projection height of one layer varies from the other layers (which are the same as each other), or the maximum projection height of each layer differs from the other layers. When the maximum projection height within a layer varies, the projections within the layer can have an average projection height of 0.5 to 20 mm, preferably 1 to 10 mm, or 3 to 10 mm, and an average projection diameter can be 0.5 to 20 mm, preferably 1 to 10 mm, or 3 to 10 mm. An average projection diameter in each layer can be 1 mm to 30 mm, preferably 2 mm to 20 mm, and an average indentation diameter can be 1 mm to 30 mm, preferably 2 mm to 20 mm. Again, the average projection or indentation diameter of each layer can be the same, or average projection or indentation diameter of one layer can vary from the other layers (which are the same), or the average projection diameter of each layer can differ from each of the other layers.

Figure 5A:
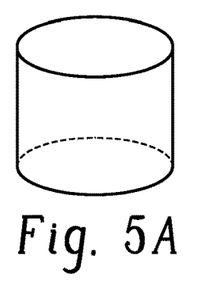
Figure 5B:
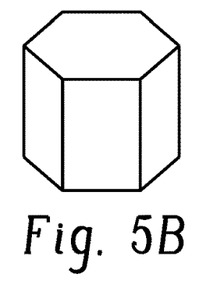
Figure 5C:
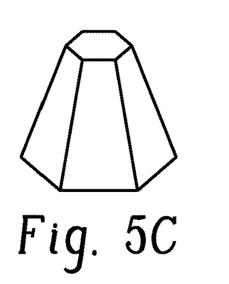
Figure 5D:
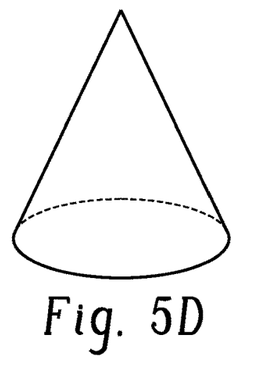
Figure 5E:
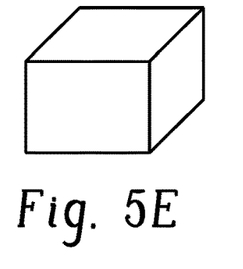
Figure 5F:
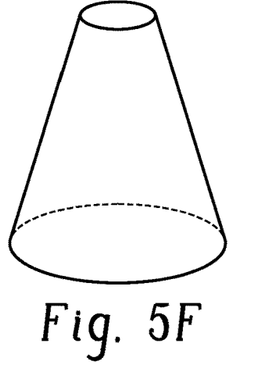
Figure 5G:
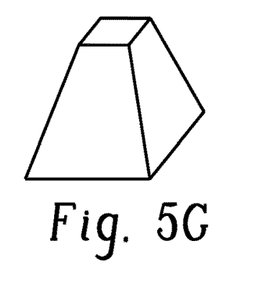
Figure 5H:
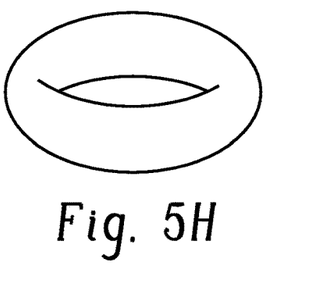
Figure 5I:
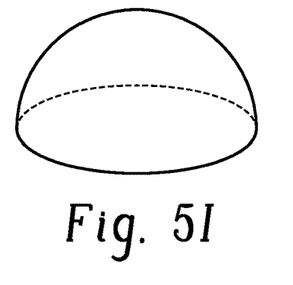
Figure 5J:
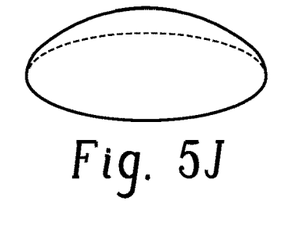
Figure 5K:
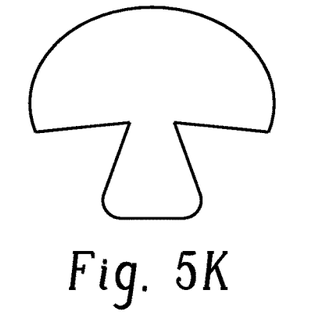
Figure 5L:
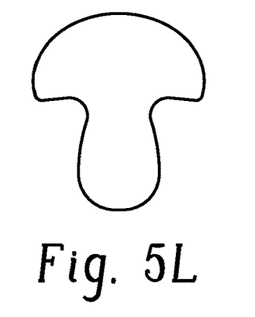
Figure 6A:
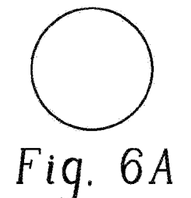
Figure 6B:
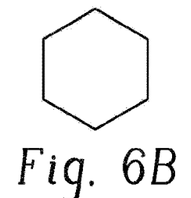
Figure 6C:
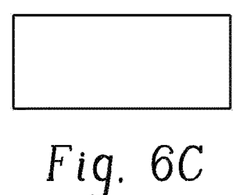
Figure 6D:
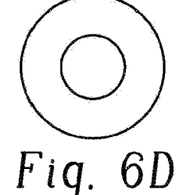
Figure 6E:
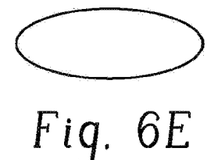

The shape of the projections and indentations can be in various forms, for example, cylindrical, spherical, hemispherical, polygonal, frustoconical, pyramidal, step, or a combination thereof, and the projections and indentations can have a cross section across each diameter that is a circle, oval, triangle, square, rectangle, or polygon. For example, with reference to FIGS. 5A-5J, the three-dimensional features can be in the shape of a cylinder (FIG. 1 and FIG. 5A), a polygon box (FIG. 5B) a tapered polygon box (FIG. 5C), a cone (FIG. 5D), a cube (FIG. 5E), a truncated cone (FIG. 5F), a square pyramid (FIG. 5G), a toroid (where the opening of the toroid does not extend through to the outer surface of the layer; FIG. 5H), a dome (FIG. 5I), an elongated dome (FIG. 5J), a mushroom shape (FIG. 5K or FIG. 5L), or any other three-dimensional form suitable for a purpose disclosed herein. Referring now to FIGS. 6A-6E, such shapes can have a z-axis cross section in the shape of a circle (FIG. 6A), a polygon (FIG. 6B), a rectangle (FIG. 6C), a ring (FIG. 6D), an ellipsoid (FIG. 6E), or any other shape suitable for a purpose disclosed herein. In an embodiment, the shape can depend on the material of the layer and the three-dimensional feature.

With further reference to FIGS. 1-3, in a preferred embodiment, each of the projections and indentations of the first array can correspond in shape to those of the second array, i.e., have substantially the same shape as each of the corresponding indentations and projections of the second array; or each of the projections and indentations of the first array can correspond to the size of the indentations and projections of the second array, i.e., have substantially the same size as each of the corresponding indentations and projections of the second array, preferably both, i.e., the first array of three-dimensional features is substantially a mirror-image of the second array of three-dimensional features in shape and size.

Figure 7:
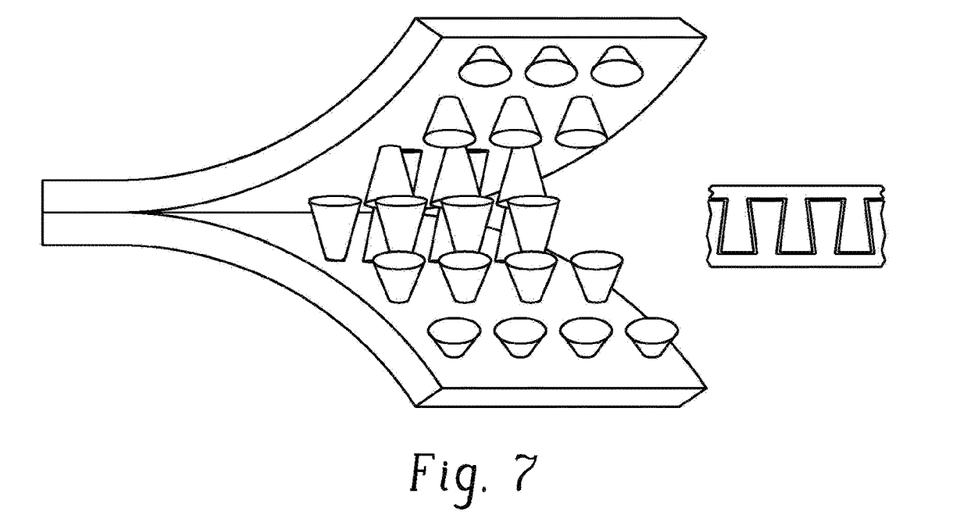
FIG. 7 shows an embodiment of multi-layer exercise mat in a state in which first and second layers of the multi-layer exercise mat are partially secured to one another and partially separated, wherein the array of three-dimensional features are frustoconical.

In an embodiment each of the first and second arrays of three-dimensional features can be shaped to interlock as well as grip the layers using friction. For example, as shown in FIG. 7, each layer includes frustoconical features. In addition to frictional forces between the frustoconical features securing the first and second layers to the each other, the geometry of adjacent frustoconical features from the opposite layers can interlock to secure the first and second layers to the each other. Other three-dimensional features of this type can be used, for example mushroom shapes. In another embodiment, the three-dimensional features of the first and second arrays can be combined with one another in the form of a dovetail.

Figure 8:
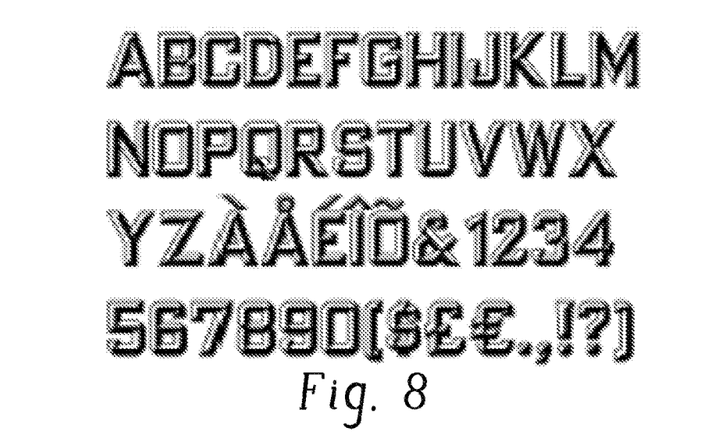
FIG. 8 show exemplary 3-dimensional lettering that can be used for the formation of 3-dimensional features comprising a logo.

Other configurations of the first and second arrays can include a logo, for example a three-dimensional design or three-dimensional letter as shown in FIG. 8, and its mirror image, in which the first array including the three-dimensional design or three-dimensional lettering can interlock with the second array of the mirror image. Other configurations include a three-dimensional tessellated design, a herringbone design, or a houndstooth, for example, in which the first array of three-dimensional features can interlock with the second array of three-dimensional features.

Figure 9:
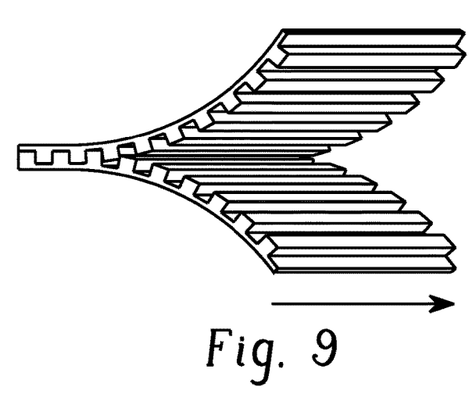
FIG. 9 shows an embodiment of multi-layer exercise mat in a state in which first and second layers of the multi-layer exercise mat are partially secured to one another and partially separated with channels.
Figure 10:
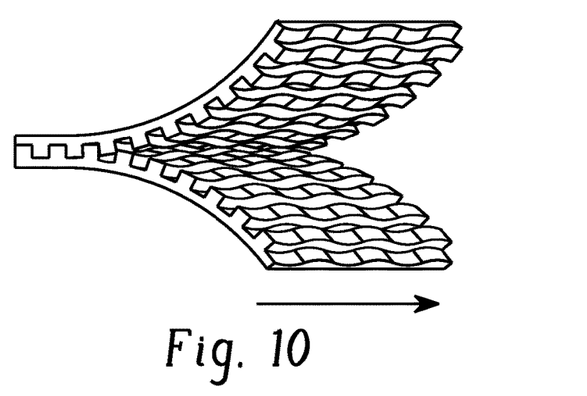
FIG. 10 shows an embodiment of multi-layer exercise mat in a state in which first and second layers of the multi-layer exercise mat are partially secured to one another and partially separated with channels.
Figure 11:
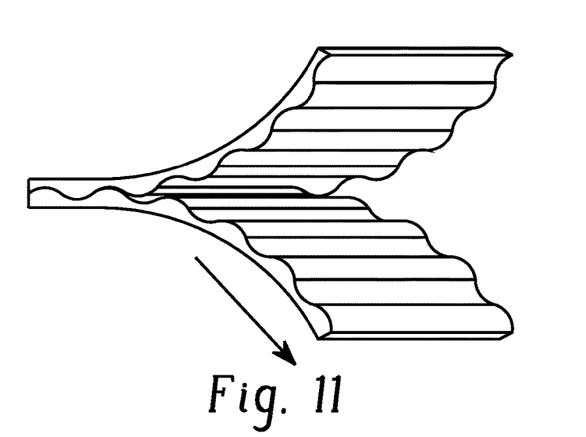
FIG. 11 shows an embodiment of multi-layer exercise mat in a state in which first and second layers of the multi-layer exercise mat are partially secured to one another and partially separated with channels.

The first array, the second array, or both can include discrete projections and indentations as shown in FIG. 1 and FIG. 7). In another embodiment, the projections or indentations of at least one array can be in the form of a channel along a length or width of the multi-layer exercise mat as shown in cross section in FIGS. 2-4 and in plan view as shown in FIGS. 9-11. Each channel can have a cross-section across its diameter that is arcuate, hemispherical, V-shaped, polygonal, or a combination thereof, e.g., or mushroom-shaped or as shown in FIG. 4. The projections or indentations of the channels can have a uniform height (H1-$bc$) in a direction along the length of each channel as shown and FIG. 9, or the projections can have a varying height undulating in a direction along the length of each channels as shown in FIG. 10, or a varying height in a direction along the diameter of the channel as shown in FIG. 11, or any combination thereof. A combination of discrete projections and channels can be used. For example, discrete projections can be used along the edges of the mats and channels can be used in the center.

The first array of three-dimensional features can be discontinuous on the inner surface of the first layer, and the second array of three-dimensional features can be correspondingly discontinuous on the inner surface of the second layer. For example, the arrays can be present at corners of the layers, in the center of the layers, in the form of discrete islands, or a combination thereof. In an embodiment, the first array of three-dimensional features can be continuous across a width or length or both of the inner surface of the first layer, and the second array of three-dimensional features can be correspondingly continuous across a width or length or both of the opposing inner surface of the second layer. The arrays can be present on an entirety of one or more of the layers, for example, in the form of a tessellation.

Optionally, one or more outermost surfaces of the multi-layer exercise mat can be printed or embossed to include a decorative pattern, with a brand logo, with "cut-to-size" markings, or a combination thereof. At least one of the outer surfaces of the first and second layers can have no arrays of three-dimensional structures with a height greater than 3 millimeters, or no arrays of three-dimensional structures with a height greater than 2 millimeters, or no arrays of three-dimensional structures with a height greater than 1 millimeter, preferably neither of the outer surfaces of the first and second layers has an array of three-dimensional structures with a height greater than 3 millimeters, or an array of three-dimensional structures with a height greater than 2 millimeters, or an array of three-dimensional structures with a height greater than 1 millimeter. The outer surfaces can be smooth or embossed, for example, lightly embossed, to provide a desired degree of slip resistance.

In an embodiment, one or more layers additional to the first and second layers as described above can be used on an outer surface of the first and second layers. These additional layers can provide different characteristics to the multi-layer exercise mat, e.g., increased cushioning, better skid protection, better wearability, or the like, or a combination thereof.

In another embodiment, the multilayer mat can comprise two, three, or more layers having the three-dimensional features. Each layer between outermost layers of the multi-layer mat is formed with the three-dimensional features on opposite sides thereof, such that each of the opposite sides can be secured to an adjacent layer.

The different layers can include one or more pressure-spreading layers to provide cushioning that distributes and relieves pressure on feet during use of the multi-layer exercise mat. One or more of the layers can be resilient, in that it does not permanently conform to feet during use of the multi-layer exercise mat. To provide an optimal balance of pressure spreading and softness, one or more of the layers can have an Asker C hardness of 5 to 70. One or more of the layers can have a density of 32 to 640 kilograms per cubic meter ($kg/m^3$) (2 to 40 pounds per cubic foot).

The different layers can be permeable to air. The air permeability of the different layers can be less than 60 seconds, for example, less than 20 seconds, for 100 cubic centimeters ($cm^3$) of air to pass through the layer under ASTM D-726-58.

Materials that meet the foregoing properties include natural and synthetic polymers. The first and the second layers can include the same or different polymers, for example, polyvinyl chloride, a thermoplastic elastomer, ethylene-vinyl acetate, polyethylene, polypropylene, polyurethane, silicone, natural or synthetic rubber, or a combination thereof. In an embodiment, the first and the second layers include the same polymer. In an embodiment at least one layer is a natural rubber, or one, two, or more layers are natural rubbers.

Optional additives can be added to the polymer compositions to achieve a desired property, such as color, antibacterial properties, deodorizing properties, and the like. For example, additives such as fillers (alumina trihydrate, silica, talc, calcium carbonate, clay, and the like), nucleating agents (e.g., zinc oxide, zirconium oxide, silica, talc, or the like), an aging modifier (e.g., a fatty acid ester, a fatty acid amide, a hydroxyl amide, or the like), dyes, pigments (for example, titanium dioxide and iron oxide), antioxidants, antiozonants, flame retardants, heat stabilizers, fragrances, anti-bacterial agents, odor-masking agents, or the like, as well as combinations comprising at least one of the foregoing additives, can also be used.

The first and the second layers can be in the form of a closed-cell cellular material, for example, a closed-cell polyurethane foam. The first and the second layers can be, for example, an air-permeable, open cell, polyurethane foam, preferably a microcellular polyurethane foam. Polyurethane foams can be formed from reactive compositions comprising an organic isocyanate component reactive with an active hydrogen-containing component(s), a surfactant, and a catalyst. Exemplary polyurethane foams include the foams available under the PORON trademark from Rogers Corporation, Rogers, Conn.

Rubber products that meet the foregoing properties can include cellular rubber products such as closed cell, cellular rubber products, including natural rubber or neoprene, ethylene propylene diene monomer (EPDM), nitrile, or styrene-butadiene rubber (SBR). Cellular rubbers can offer tough, durable, non-skid cushioning with a pleasing texture. Cellular rubber can have excellent non-skid performance. Excellent tensile strength can provide superior durability. Cellular rubber made with natural rubber can offer cushioning combined with a nice feel and exceptional breathability.

Cellular rubber products can be formed by die ejection. Cellular rubber products can have various hardnesses and resiliencies and offer exceptional spring force. Cellular rubber products can be provided as either roll or sheet goods to support flexible manufacturing and faster cutting speed and efficiency that cellular rubber products can allow. The high resilience offered by cellular rubber can result in rapid, reliable material ejection.

Benefits of cellular rubber products include anti-slip properties (natural rubber is inherently anti-slip with a high coefficient of friction), ability to be laminated with a broad range of materials including textiles and cork, availability of thicknesses in a range of 1 millimeter (mm) to 30 mm, resistance to abrasion and tearing. Exemplary cellular rubbers include the open cell natural rubber product KUSHON from Rogers Corporation, Rogers, Conn.

One or more of the layers can be treated with an antimicrobial agent to reduce odor-causing microorganisms. Examples of such antimicrobial agents include: silane functionalized quaternary amines such as Microbe Shield™ available from AEGIS Environments; colloidal silver solutions such as Silpure™ available from Thompson Research Associates, Canada; silver chelated polymer solutions such as SilvaDur™ available from Rohm & Haas; biguanides such as polyhexamethylene biguanide sold under the trade names Vantocil™ and Cosmocil™ available from Arch Chemicals; and antimicrobial additives available from Microban under the Microban trademark. Treatment can comprise incorporating the antimicrobial agent into one or more materials used to manufacture the multi-layer exercise mat, or by a post-treatment process, for example, spraying or coating.

A method of manufacturing the multi-layer exercise mat includes forming the first layer, forming the second layer, and optionally securing the first and second layers to each other by contacting the first array of three-dimensional features and the second array of three-dimensional features with each other to grip each other. Forming the first layer can include embossing the first array three-dimensional features on the inner surface of the first layer, forming the second layer can include embossing the second array of three-dimensional features on the inner surface of the second layer, or a combination thereof.

Figure 12:
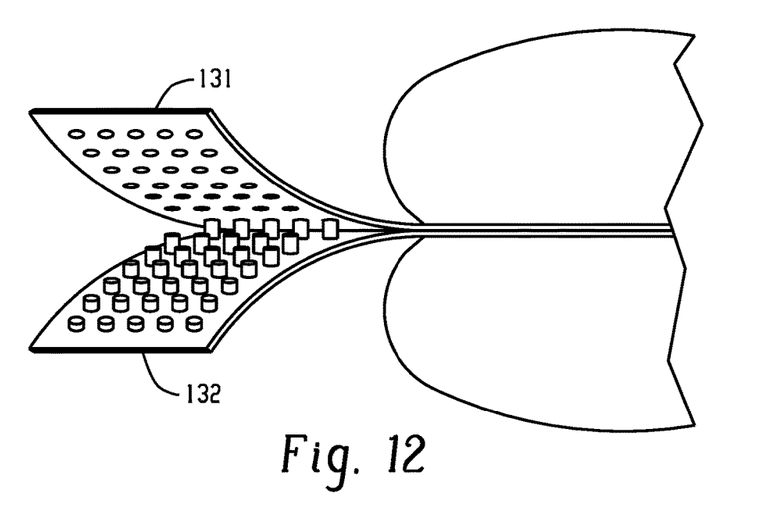
FIG. 12 shows an embodiment for forming three-dimensional features in the form of projections.

Forming the first layer, forming the second layer, or a combination thereof can include casting or molding, for example, injection molding. In an embodiment, a composition for forming a layer can be cast, for example, onto a carrier or another layer. A second carrier can be placed on the cast composition on a side opposite the first carrier to control the thickness of the composition. The composition can be spread to a layer of desired thickness, e.g., by a doctoring blade or other spreading device. Placement of the second carrier can be used to spread the composition and adjust the layer to the desired thickness. Three-dimensional features in the form of projections can be formed by providing indentations in a carrier 131 in a curing system, with cured features in the form of projections formed on layer 132, after separation of the layer 132 from the carrier 131 (see FIG. 12).

The selection of materials for carriers will depend on factors such as the desired degree of support and flexibility, the desired degree of releasability from the layer, cost, aesthetics, and the like considerations. Paper, thin sheets of metal such as stainless steel, or polymer films such as polyethylene terephthalate, silicone, or the like, can be used. The material can be coated with a release coating. A fibrous web or other filler material can be disposed on the surface of the carrier, and thereby become ultimately incorporated into the layer. In some embodiments, the layer can cure or become bonded to a carrier. One carrier can form part of the final product instead of being separated from the layer. In an embodiment, a conveyor belt can be used as the bottom carrier.

One or more of the layers of the multilayer mat can be separately manufactured or purchased, for example, in the form of sheets. The sheets can then be secured to one another by the three-dimensional features and then cut to the desired size. Cutting can be, for example, die cutting. It is also possible to cut each layer into the desired shape and then securing the cut layers to each other. The multi-layer exercise mat can then be cut to the desired size.

Set forth below are some aspects of the multi-layer exercise mat and methods of making the same.

Aspect 1: A multi-layer exercise mat comprising: a first layer comprising an outer surface and an opposing inner surface, the opposing inner surface of the first layer comprising a first array of three-dimensional features integral with the first layer; and a second layer comprising an outer surface and an opposing inner surface, the opposing inner surface of the second layer comprising a second array of three-dimensional features integral with the second layer, wherein the first and second arrays of three-dimensional features are configured to grip each other to removably secure the inner surface of the first layer to the inner surface of the second layer.

Aspect 2: The multi-layer exercise mat of aspect 1, wherein each of the first and second layers has a total thickness of 1 to 30 millimeters, preferably 1 to 5 millimeters.

Aspect 3: The multi-layer exercise mat of aspect 1 or 2, wherein the first and the second layers comprise the same or different polymers, wherein the polymer comprises polyvinyl chloride, a thermoplastic elastomer, ethylene-vinyl acetate, polyethylene, polypropylene, polyurethane, silicone, natural or synthetic rubber, or a combination thereof, preferably wherein the first and the second layers comprise the same polymer, which comprises a natural rubber.

Aspect 4: The multi-layer exercise mat of any preceding aspect, wherein at least one of the outer surfaces of the first and second layers have no arrays of three-dimensional structures with a height greater than 3 millimeters, or no arrays of three-dimensional structures with a height greater than 2 millimeters, or no arrays of three-dimensional structures with a height greater than 1 millimeter; preferably wherein neither of the outer surfaces of the first and second layers has an array of three-dimensional structures with a height greater than 3 millimeters, or an array of three-dimensional structures with a height greater than 2 millimeters, or an array of three-dimensional structures with a height greater than 1 millimeter.

Aspect 5: The multi-layer exercise mat of any preceding aspect, wherein the first array of three-dimensional features interlocks with the second array of three-dimensional features.

Aspect 6: The multi-layer exercise mat of any preceding aspect, wherein the first array of three-dimensional features is substantially a mirror-image of the second array of three-dimensional features.

Aspect 7: The multi-layer exercise mat of any preceding aspect, wherein the three-dimensional features of the first array comprises projections and indentations and the three-dimensional features of the second array comprises projections and indentations, wherein each of the projections individually have: a maximum projection height of 1 to 10 millimeters, preferably 2 to 8 millimeters; a maximum base height of 20 to 29 millimeters, preferably 22 to 28 millimeters; and an average projection diameter of 1 to 30 millimeters, preferably 2 to 20 millimeters.

Aspect 8: The multi-layer exercise mat of aspect 7, wherein each of the projections and indentations of the first array has substantially the same shape as each of the projections and indentations of the second array; each of the projections and indentations of the first array has substantially the same size as each of the projections and indentations of the second array; or both.

Aspect 9: The multi-layer exercise mat of aspect 7 or 8, wherein the first array, the second array, or both comprises discrete projections and indentations.

Aspect 10: The multi-layer exercise mat of aspect 9, wherein the projections and indentations have a cross section across each diameter that is a circle, oval, triangle, square, rectangle, or polygon.

Aspect 11: The multi-layer exercise mat of aspect 9 or 10, wherein the shape of the projections and indentations is cylindrical, spherical, hemispherical, polygonal, frustoconical, pyramidal, step, or a combination thereof.

Aspect 12: The multilayer exercise mat of any of aspects 7 to 11, wherein the indentations of at least one array comprises a channel along a length or width of the multi-layer exercise mat.

Aspect 13: The multilayer exercise mat of aspect 12, wherein each channel has a cross-section across its diameter that is arcuate, hemispherical, V-shaped, polygonal, or a combination thereof.

Aspect 14: The multi-layer exercise mat of any preceding aspect, wherein the first array of three-dimensional features is discontinuous on the inner surface of the first layer, and the second array of three-dimensional features is correspondingly discontinuous on the inner surface of the second layer.

Aspect 15: The multi-layer exercise mat of any preceding aspect, wherein the first array of three-dimensional features is continuous across a width or length or both of the inner surface of the first layer, and the second array of three-dimensional features is correspondingly continuous across a width or length or both of the opposing inner surface of the second layer.

Aspect 16: The multi-layer exercise mat of any preceding aspect, wherein the first layer, the second layer, or a combination thereof has an Asker C hardness of 5 to 70.

Aspect 17: The multi-layer exercise mat of any preceding aspect, wherein the first layer, the second layer, or a combination thereof has a density of 32 to 640 kilograms per cubic meter.

Aspect 18: A method of manufacture of the multi-layer exercise mat of any preceding aspect, the method comprising: forming the first layer; and forming the second layer.

Aspect 19: The method of aspect 18, wherein forming the first layer comprises embossing the first array three-dimensional features on the inner surface of the first layer, forming the second layer comprises embossing the second array of three-dimensional features on the inner surface of the second layer, or a combination thereof.

Aspect 20: The method of aspect 18 or 19, wherein forming the first layer, forming the second layer, or a combination thereof comprises casting or molding.

Aspect 21: The method of any of aspects 18 to 20, further comprising securing the first and second layers to each other by contacting the first array of three-dimensional features and the second array of three-dimensional features with each other to grip each other.

Use of the terms "a" and "an" do not denote a limitation of quantity, but rather denote the presence of at least one of the referenced item. "Or" means "and/or". Ranges disclosed herein are inclusive of the recited endpoint and are independently combinable. "Combination" is inclusive of blends, mixtures, alloys, reaction products, and the like. Also, "combination thereof" means that the list is inclusive of each element individually, as well as combinations of two or more elements of the list, and combinations of at least one element of the list with like elements not named. The terms "first", "second", and so forth, herein do not denote any order, quantity, or importance, but rather are used to distinguish one element from another. While certain combinations of features have been described herein, it will be appreciated that these certain combinations are for illustration purposes only and that any combination of any of these features can be employed, explicitly or equivalently, either individually or in combination with any other of the features disclosed herein, in any combination, and all in accordance with an embodiment. Any and all such combinations are contemplated herein and are considered within the scope of the disclosure. Unless otherwise stated, the test standards are the latest as of the date of filing. The Figures are not shown to scale for clarity.

Unless defined otherwise, technical and scientific terms used herein have the same meaning as is commonly understood by one of skill in the art to which this invention belongs. All cited patents, patent applications, and other references are incorporated herein by reference in their entirety. However, if a term in the present application contradicts or conflicts with a term in the incorporated reference, the term from the present application takes precedence over the conflicting term from the incorporated reference.

While the invention has been described with reference to exemplary embodiments, it will be understood by those skilled in the art that various changes can be made, and equivalents can be substituted for elements thereof without departing from the scope of this disclosure. In addition, many modifications can be made to adapt a particular situation or material to the teachings without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments and, although specific terms can have been employed, they are unless otherwise stated used in a generic and descriptive sense only and not for purposes of limitation.

What is claimed is:

1. A multi-layer exercise mat comprising:
   a first layer comprising an outer surface and an opposing inner surface, the opposing inner surface of the first layer comprising a first array of three-dimensional features integral with the first layer; and
   a second layer comprising an outer surface and an opposing inner surface, the opposing inner surface of the second layer comprising a second array of three-dimensional features integral with the second layer,
   wherein the first and second arrays of three-dimensional features are configured to grip each other through frictional force to removably secure the inner surface of the first layer to the inner surface of the second layer,
   wherein the first layer, the second layer, or a combination thereof has
   an Asker C hardness of 5 to 70, or
   a density of 32 to 640 kilograms per cubic meter, or
   the Asker C hardness of 5 to 70 and the density of 32 to 640 kilograms per cubic meter,
   wherein the three-dimensional features of the first array comprise projections and the three-dimensional features of the second array comprise projections,
   wherein the projections of the first array have a substantially same shape as the projections of the second array, wherein spaces between the projections of the first array are not a same shape as the projections of the first array, and wherein the projections of the second array fit between the projections of the first array and are sized to frictionally engage the projections of the first layer.

2. The multi-layer exercise mat of claim 1, wherein each of the first and second layers has a total thickness of 1 to 30 millimeters.

3. The multi-layer exercise mat of claim 1, wherein the first and the second layers comprise the same or different polymers, wherein the polymer comprises polyvinyl chloride, ethylene-vinyl acetate, polyethylene, polypropylene, polyurethane, silicone, natural or synthetic rubber, or a combination thereof.

4. The multi-layer exercise mat of claim 1, wherein at least one of the outer surfaces of the first and second layers have no arrays of three-dimensional structures.

5. The multi-layer exercise mat of claim 1, wherein the first array of three-dimensional features interlocks with the second array of three-dimensional features.

6. The multi-layer exercise mat of claim 1, wherein the first array of three-dimensional features is substantially a mirror-image of the second array of three-dimensional features.

7. The multi-layer exercise mat of claim 1, wherein each of the projections individually have:
   a maximum projection height of 1 to 10 millimeters;
   a maximum base height of 20 to 29 millimeters; and
   an average projection diameter of 1 to 30 millimeters.

8. The multi-layer exercise mat of claim 7, wherein each of the projections of the first array has substantially the same size as each of the projections of the second array.

9. The multi-layer exercise mat of claim 1, wherein the first array of three-dimensional features is continuous across a width or length or both of the inner surface of the first layer, and the second array of three-dimensional features is correspondingly continuous across a width or length or both of the opposing inner surface of the second layer.

10. The multi-layer exercise mat of claim 1, wherein the first layer, the second layer, or a combination thereof has an Asker C hardness of 5 to 70.

11. The multi-layer exercise mat of claim 1, wherein the first layer, the second layer, or a combination thereof has a density of 32 to 640 kilograms per cubic meter.

12. A method of manufacture of the multi-layer exercise mat of claim 1, the method comprising:
   forming the first layer; and
   forming the second layer.

13. The method of claim 12, wherein forming the first layer comprises embossing the first array three-dimensional features on the inner surface of the first layer, forming the second layer comprises embossing the second array of three-dimensional features on the inner surface of the second layer, or a combination thereof.

14. The method of claim 12, wherein forming the first layer, forming the second layer, or a combination thereof comprises casting or molding.

15. The method of claim 12, further comprising securing the first and second layers to each other by contacting the first array of three-dimensional features and the second array of three-dimensional features with each other to grip each other.

* * * * *